June 19, 1928.
J. C. BOYLE
1,674,423
LOCOMOTIVE CAB WINDOW PROTECTOR
Filed Oct. 28, 1927 3 Sheets-Sheet 2
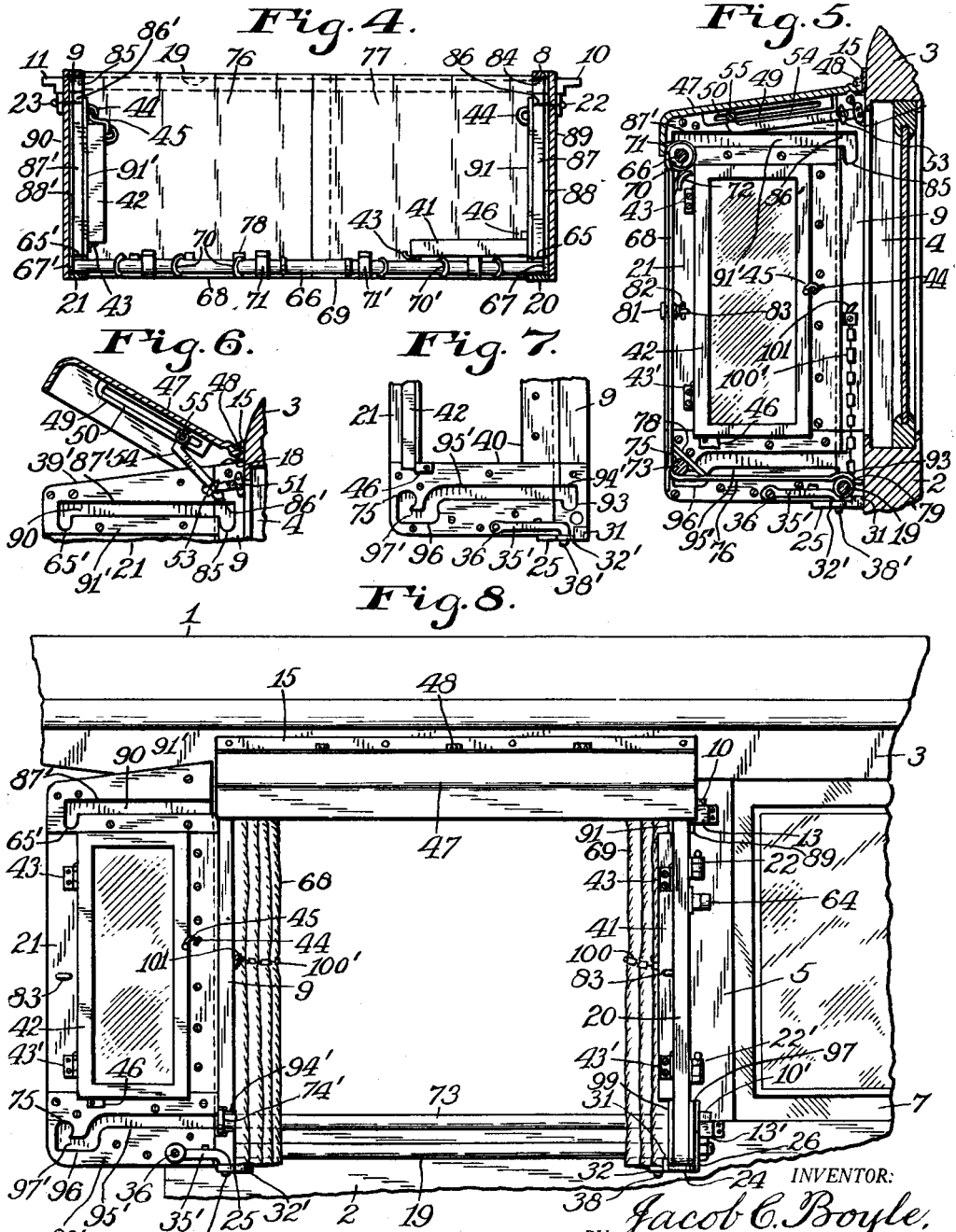
INVENTOR:
Jacob C. Boyle,
BY E. D. Silvius,
ATTORNEY.

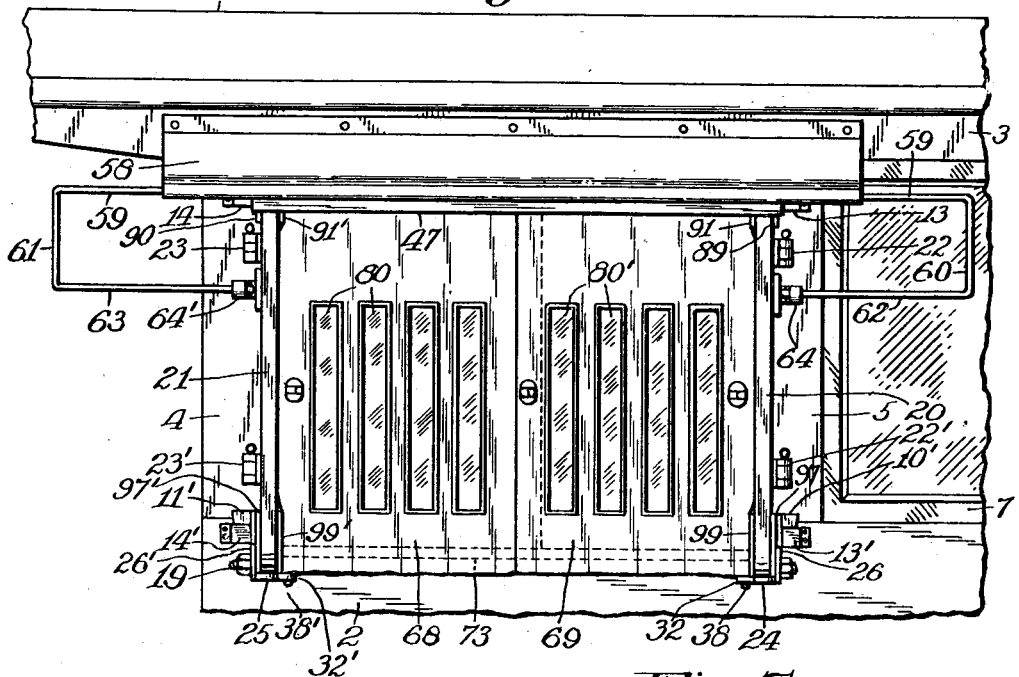
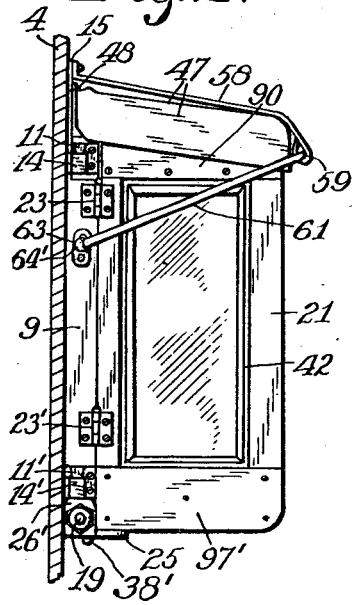
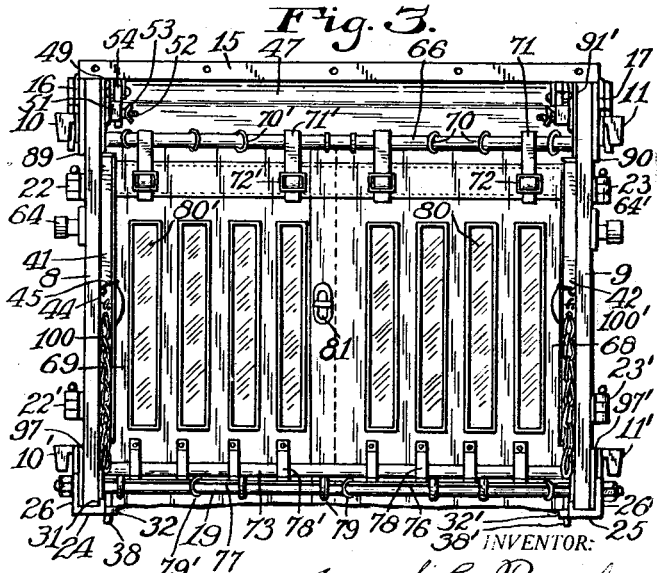

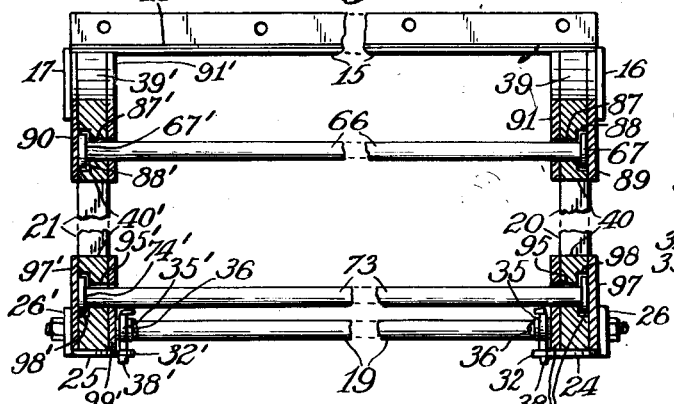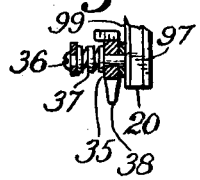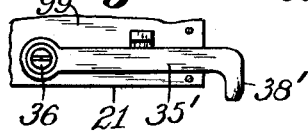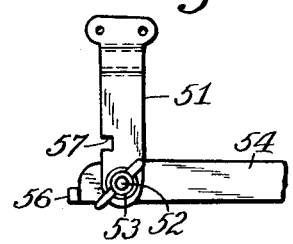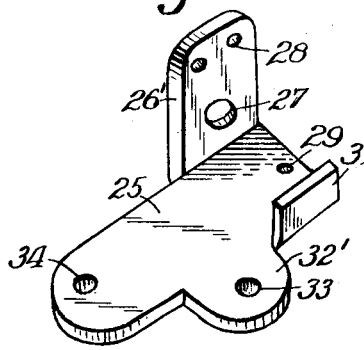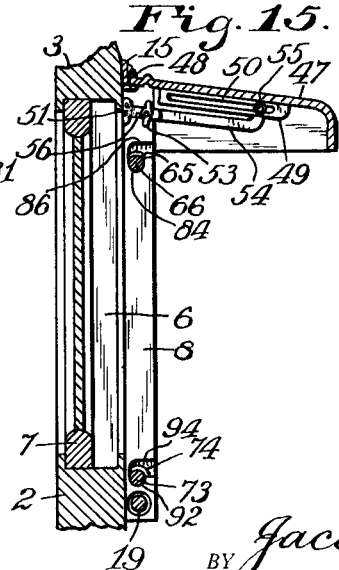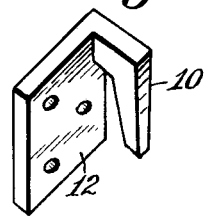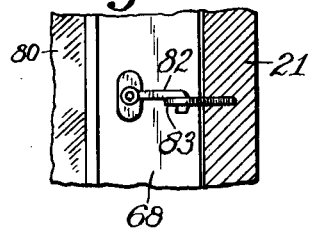

Patented June 19, 1928.

1,674,423

UNITED STATES PATENT OFFICE.

JACOB C. BOYLE, OF INDIANAPOLIS, INDIANA.

LOCOMOTIVE-CAB-WINDOW PROTECTOR.

Application filed October 28, 1927. Serial No. 229,433.

This invention relates to means adapted to shield a locomotive engineer or driver when he leans out of the locomotive cab window, the invention having reference more particularly to improvements in means for guarding locomotive engineers against ill effects of cold or stormy weather when operating locomotives, relating also to improvements in the appliance disclosed in my application for Letters Patent of the United States filed January 31, 1927, Serial No. 164,791, of which this is a continuation.

An object of the invention is to provide an improved locomotive cab window protector generally that shall be of such construction as to be highly efficient in the protection of locomotive engineers under various conditions, and which may be constructed at reasonable cost.

Another object is to provide a cab window protector which shall be of sectional construction and adapted to be variously modified and capable of being readily attached to existing cabs or other structures having shiftable windows, or to be permanently attached to new cabs or other structures.

A further object is to provide an improved knock-down locomotive cab window protector which shall be of such construction as to permit engineers to provide their own protectors, if desired for their health and comfort, and be readily removable in whole or in part from the cab and cared for by the engineer when not on duty, and which shall be durable and economical in use.

A still further object is to provide a locomotive cab window protector which shall be so constructed as to have a wide range of usefulness, especially in consequence of different weather conditions and temperatures, and which shall be adapted to be applied to windows of dwellings as protection when it may be desired to open the windows.

With the above-mentioned and other objects in view, the invention consists in a novel window protector or appliance adapted to afford an off-set window; the invention consisting also further in the parts and in the combinations and arrangements of parts as hereinafter fully described and further defined in the accompanying claims.

Referring to the drawings,—Figure 1 is a fragmentary side elevation of a locomotive cab and the improved protector applied thereto; Fig. 2 is an elevation of one end of the protector; Fig. 3 is an inside view of the protector as it appears when removed from the cab; Fig. 4 is a horizontal section of the protector taken on a plane a short distance below the top thereof; Fig. 5 is a vertical transverse section of the protector approximately central in connection with a portion of the cab; Fig. 6 is a fragmentary detail showing the top part of the roof of the protector propped up for ventilation; Fig. 7 is a fragmentary view of one of the ends of the protector; Fig. 8 is a fragmentary side view of the cab and the improved protector thereon with parts of the latter in various adjusted positions; Fig. 9 is a vertical longitudinal section showing the principal frame parts on an enlarged scale, portions being broken away; Fig. 10 is an inverted plan of a portion of the preceding figure illustrating adjustments of parts thereof; Figs. 11 and 12 are fragmentary detail views showing associated parts on an enlarged scale; Fig. 13 is an enlarged detail view of devices for supporting the cover or roof of the protector; Fig. 14 is an enlarged perspective view of one of the parts appearing less distinctly in other views; Fig. 15 is a fragmentary sectional view showing the roof of the protector supported when the main parts of the protector are absent; Fig. 16 is a perspective view of one of the devices for securing the protector to a cab, being on an enlarged scale, and Fig. 17 is a fragmentary detail on an enlarged scale to clearly show fastening features of the appliance.

Similar reference characters in the various figures of the drawings indicate corresponding elements or features of construction herein referred to in detail.

The invention being applicable to any structure provided with a window that may be opened, although primarily intended to be especially useful in connection with locomotive cabs, the invention is illustrated as applied to such a cab, cabs being variously constructed and of different materials entailing modifications of structure, a wooden cab being shown, the numeral 1 indicating the cab roof, 2 the lower portion of the right-hand side part of the cab, 3 the upper portion, 4 the rearward portion, and 5 the forward portion of the frame of the window used by the engineer, and the portion 5 for the purposes of invention in some cases may be a removable part at a suitable distance from the rearward side 6 of the frame of the window used by the engineer, in some cases there being a forward window sash 7 permanently arranged.

The improved protector is of suitable dimensions to cover the window opening that is used by the engineer and comprises two vertical base members 8 and 9 adapted to be closely arranged removably against the side of the cab, and one base member has hook-like fasteners 10 and 10' fixed thereto, the opposite member having similar reversed fasteners 11 and 11' fixed thereto, each fastener preferably having a right-angled base plate 12 whereby it is secured to the member. The side part 5 has keepers 13 and 13' secured to the outer side thereof to receive two of the fasteners, the rearward portion 4 having similar keepers 14 and 14' to receive the remaining two fasteners, whereby the base members are detachably secured to the cab. A top rail 15 is arranged on the top of the base members and has downturned end plates 16 and 17 that are secured to the base members respectively, the rail 15 preferably having a water-shed 18. A tie rod 19 is connected to the lower portions of the base members and secured thereto by means of nuts thereon clamping the base members to the tie rod at the required distance apart.

The improved protector has two upright end parts 20 and 21, the part 20 being connected to the base member 8 by means of loose pin hinges 22 and 22', the end part 21 being connected to the base member 9 by means of similar hinges 23 and 23'. Locking devices for the end parts are provided which comprise lock plates 24 and 25 secured to the bottoms of the base members respectively and extending under the adjacent end parts, one plate having a side plate 26 and the other a similar plate 26' extending agains the outer side of the base member for securing the lock plate thereto, each side plate having an aperture 27 through which the tie rod extends and having also small holes 28 to receive securing bolts, the lock plate preferably having a hole 29 to receive a screw 30 whereby to further secure the lock plate to the base members. Each lock plate preferably has also a lip 31 opposite to the side plate to engage the inner side of the adjacent base member. The lock plates have ears 32 and 32' respectively on their inner edges, each ear having a hole 33 therein to receive a locking pin. Each lock plate has also a hole 34 therein which normally is under the adjacent end part, to receive the locking pin when the end part is swung back on its hinges to the side of the cab. The end parts have locking bars 35 and 35' respectively on the inner side thereof, each bar being connected to the end part by means of a pivot bolt 36 which preferably has a spring 37 under its head and engaging the bar to prevent looseness of the parts, the bars having locking pins 38 and 38' respectively to be entered in the holes that are in the lock plates. The end parts have inclined tops 39 and 39' respectively and also doorways 40 and 40' and doors 41 and 42 respectively, each door being connected to the end part by means of hinges 43 and 43'. The doors are arranged on the inner sides of the end parts to swing inwardly and towards the front of the protector, and each part is provided with an eye 44 engaged by a hook 45 connected to the door to fasten the latter securely in closed position. A button 46 is pivoted on the inner side of each end part below the door whereby to secure the door in open position. The door as usual has window panes through which to observe signals.

An awning-like roof 47 is provided which is adapted to rest upon the tops of the end parts and is connected to the rail 15 by means of hinges 48, and the under side of the roof has adjusting bars 49 secured thereto and provided with longitudinal slots 50; a supporting arm 51 is secured to each base member below the roof and provided with a binding screw 52 having a wing nut 53 thereon whereby an adjusting arm 54 is adjustably secured thereto and provided with a contact pin 55 to operate in the slots 50. The arm 54 has a lateral projection 56 that is received into a notch 57 in the supporting arm when the two arms are relatively in alinement, to securely support the roof in the absence of the end parts of the protector, the arms 54 being adapted to be adjusted at various angles to support the roof when swung up to various angles.

On some locomotive cabs a fabric awning 58 is attached to the cab above the window, or may be attached to the rail 15 in case it be desired to omit the metallic roof, the awning being connected to a rod 59 that extends forward and rearward of the protector and has arms 60 and 61 on its ends that are connected to rear rods 62 and 63 which are removably connected with sockets 64 and 64' secured to the base members 8 and 9 respectively to permit the arms to be swung upward more or less so that the awning is slackened to permit air to pass between it and the roof 47, in case the awning is applied to the roof to prevent the roof from absorbing sun heat to the discomfort of the engineer.

The upper portion of the end parts 20 and 21 are provided respectively with sockets 65 and 65' adjacent to the front edges thereof and a curtain rod 66 is normally arranged in the sockets for support, the rod having collars 67 and 67' on its ends. The front of the protector is composed of two flexible parts or sections 68 and 69 composed of suitable fabric and connected to the rod 66 by means of rings 70 and 70' respectively and preferably also by means of adjusting straps 71 and 71' having buckles 72 and 72', the parts being thus adjustably supported by the rod and have support also on the lower rod 73 which has collars 74 and 74' on its ends, the rod being suitably connected to the flexible sections and supported in bearing sockets 75 in the lower portion of the end parts. The protector has also flexible bottom sections 76 and 77 that are connected to the front sections at the rod 73, either integrally or otherwise, and preferably a suitable number of straps 78 and 78' are secured thereto to constitute loops over the rod 73. The bottom sections extend back over the tie rod 19 and are connected thereto by means of rings 79 and 79' permitting the bottom sections to move along the rod when the front sections are folded back to the end parts of the protector. The flexible front sections have a suitable number of narrow transparent widow panes 80 and 80' respectively which preferably are composed of celluloid. The sections overlap one another and are usually connected together by a suitable button 81, and the sections or flexible parts each have a hook 82 pivoted thereto to be connected with an eye 83 secured to the adjacent end part.

For the purpose of shifting the sectional front back to the cab when it is desired to remove the end parts of the protector or to swing them back to the cab, the upper portions of the base members are provided with sockets 84 and 85 respectively to support the rod 66, the members having also channels 86 and 86' leading from the upper portions of the sockets and in alinement with channels 87 and 87' that lead therefrom in the end parts to the sockets 65 and 65' respectively. The outer sides of the end parts have channels 88 and 88' respectively to receive the collars that are on the rod 66, the channels preferably being covered by plates 89 and 90 secured to the outer sides of the end parts 20 and 21 respectively, and when said end parts are composed of wood the inner sides have reinforcement plates 91 and 91' thereon respectively. The lower portions of the base members have sockets 92 and 93 respectively and channels 94 and 94' leading from the upper portions of the sockets to communicate with channels 95 and 95' in the lower portions of the end parts respectively that lead to the lower portions of the sockets 75, the channels having each a loop 96 that is lower than the socket, provision thus being made for shifting the rod 73 from the front portions of the end parts to the base members. Preferably the end parts have cover plates 97 and 97' on their outer sides to cover the collars on the rod which are received in channels 98 and 98' cut in the end parts; and preferably the inner sides of the end parts have reinforcing plates 99 and 99' secured thereto.

The base members are provided with suitable means to hold the flexible front sections when folded back as curtains, chains 100 and 100' preferably being provided for the purpose and connected with hooks 101 suitably secured to the base members.

In practical use the engineer leans out of the open cab window with increased range of vision and may look either ahead or rearward, or through the windows in the flexible front. The forward and rearward doors may be opened if desired, and in fair weather or when necessary one or both of the flexible front sections may be drawn back from their normal position. Also the roof may be lifted more or less and propped to obtain improved ventilation. The flexible front sections may be shifted from their normal positions back to the cab and supported by the base members and their rods; the end parts remaining as wind-breaks; and further, the sections may be drawn apart when not needed for protection, and also the end parts may be unlocked and swung back to the side of the cab or may be readily removed entirely, especially when the locomotive cab is being repainted, the roof also being removed if desired. At times the main parts of the protector may be removed while the roof is retained to protect the engineer from the hot sun rays. When the end parts are swung back towards the cab the rails 66 and 73 may readily be removed from the base members with the front sections on the rods.

What is claimed as new is:

1. A window protector having two hinged end parts and a flexible front part provided with supporting rods shiftably supported either by the front portions or by other portions of the end parts.

2. A window protector having two-part ends, and flexible front parts to be supported by either of the parts of the ends and provided with means to secure the front parts each to the part of the end that supports it.

3. A window protector having two opposite end closures comprising each a base member and an end part hinged to the base member, and a flexible front part provided with means to support it either on the end parts or on the base members.

4. A window protector having two base members provided each with means to securely support it, and two end parts hinged to the base members respectively to swing outwardly, each end part being provided with a securing lock.

5. A window protector having two base members and two end parts hinged at one side thereto to swing outwardly, two doors hinged to the opposite side of the end parts to swing inwardly, and means to securely support each one of the base members.

6. A window protector having a pair of main end parts, each part having a base member hinged thereto, two curtain rods shiftable from the main parts to the base members or from the base members to the main parts, and a flexible front part connected to the curtain rods.

7. A window protector having a pair of main end parts provided each with a hinged base member and a hinged door, each base member being provided with means to bodily support it whereby to support the main part, and a flexible front part provided with rods connectible to the base members and thence shiftable to the main end parts.

8. A window protector having a pair of main end parts, each part having a base member hinged thereto, a tie-rod secured to the base members, two curtain rods connected to the main end parts, a pair of flexible front sections connected to the curtain rods, and a pair of flexible floor sections connected to the tie-rod and one of the curtain rods.

9. A window protector having two base members provided with sockets, two end parts provided also with sockets, the end parts being hinged to the base members respectively to swing outwardly, two rods normally arranged in the sockets of the end parts and being shiftable to the sockets of the base parts, and flexible front sections connected to the two rods.

10. A window protector including a pair of end parts and a pair of base members hinged to the end parts respectively, a flexible front part mounted on the end parts, a flexible floor connected with the flexible front part, a flexible awning to be supported upon the end parts, and a rod connected to the awning and having arms pivotally supported on the base members.

11. A window protector including a pair of end parts having each a socket in its upper portion and a socket in its lower portion and also channels leading from the sockets respectively to the back edge of the end part, a curtain rod supported in the upper sockets and shiftable through the channels that lead therefrom, a curtain rod supported in the lower sockets and shiftable through the channels that lead therefrom, and a flexible front part connected to the curtain rods.

12. A window protector including two opposite base members having each a socket in its inner side and channels leading from the sockets respectively, two end parts hinged to the base members and having each a socket in its inner side and channels leading from the sockets to the channels in the base members, a curtain rod shiftable through the channels to the sockets in the base members or to the sockets in the end parts, and a flexible front part connected to the curtain rod.

13. A window protector including two base members, a top rail and a tie-rod secured to the members at their upper and lower portions respectively, a roof hinged to the top rail and having slotted bars on its under side, supporting arms secured to the base members respectively, two adjusting arms adjustably connected to the supporting arms respectively and having slidable connection with the slotted bars, and two end parts detachably hinged to the base members respectively.

14. A window protector including an upper curtain rod and a lower curtain rod, two end parts bodily supporting the rods, two base members hinged to the end parts, a tie-rod secured to the base members, a flexible front part and a flexible bottom part connected together and having slipping connection with the lower curtain rod, the bottom part having connection with the tie-rod, and adjusting straps and buckles connected with the flexible front part and the upper curtain rod.

15. In a locomotive cab window protector, the combination of two base members spaced apart, two end parts hinged to the base members respectively to swing outwardly, two lock plates on the bottoms of the base members respectively and having each a side plate, each lock plate having a locking hole adjacent to the inner side of the base member and a like hole beyond the front face of said member, a tie-rod secured to the end parts and securing said side plates rigidly to said parts, and two locking bars pivoted to the end parts respectively to co-operate in said holes with the lock plates to fasten the end parts in different positions on the base members.

In testimony whereof, I affix my signature on the 24th day of October, 1927.

JACOB C. BOYLE.